United States Patent
Koch et al.

(10) Patent No.: US 6,450,786 B1
(45) Date of Patent: Sep. 17, 2002

(54) COOLING WATER PUMP

(75) Inventors: Stefan Koch, Achern; Stefan Kotthaus, Sinzheim; Joerg Wolf, Karlsruhe, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/647,566

(22) PCT Filed: Feb. 1, 2000

(86) PCT No.: PCT/DE00/00261

§ 371 (c)(1),
(2), (4) Date: Nov. 14, 2000

(87) PCT Pub. No.: WO00/46507

PCT Pub. Date: Aug. 10, 2000

(30) Foreign Application Priority Data

Feb. 2, 1999  (DE) .......................... 199 03 817

(51) Int. Cl.[7] .............................................. F04B 17/00
(52) U.S. Cl. .............................. 417/423.1; 417/423.7; 417/423.14; 439/485
(58) Field of Search .......................... 417/423.1, 423.7, 417/423.14, 366, 420; 439/485, 196

(56) References Cited

U.S. PATENT DOCUMENTS

| | | | | |
|---|---|---|---|---|
| 3,932,068 A | * | 1/1976 | Zimmermann | 417/420 |
| 4,013,384 A | * | 3/1977 | Oikawa | 417/368 |
| 4,135,863 A | * | 1/1979 | Davis et al. | 417/420 |
| 4,204,810 A | | 5/1980 | Vogel | |
| 4,226,574 A | * | 10/1980 | Villette | 417/420 |
| 4,428,719 A | * | 1/1984 | Hayashibara et al. | 417/354 |
| 4,836,147 A | * | 6/1989 | Morris | 123/41.44 |
| 5,268,815 A | * | 12/1993 | Cipolla et al. | 361/704 |
| 5,725,392 A | * | 3/1998 | Bianca et al. | 439/590 |
| 5,810,568 A | * | 9/1998 | Whitefield et al. | 417/423.8 |
| 5,915,931 A | * | 6/1999 | Lindner et al. | 417/420 |
| 6,019,613 A | * | 2/2000 | Kataoka et al. | 439/83 |
| 6,129,528 A | * | 10/2000 | Bradbury et al. | 417/423.1 |
| 6,270,320 B1 | * | 8/2001 | Heyder et al. | 417/44.1 |

FOREIGN PATENT DOCUMENTS

| | | | |
|---|---|---|---|
| CH | 414 354 | 12/1966 | |
| DE | 3822897 A1 | 1/1990 | |
| DE | 04008278 A1 | * 9/1991 | .............. 417/420 |
| DE | 44 11 960 A1 | 10/1995 | |
| DE | 196 24 145 A1 | 1/1998 | |
| EP | 0 481 423 A1 | 4/1992 | |
| WO | 93/00513 | 1/1993 | |

* cited by examiner

Primary Examiner—Timothy S. Thorpe
Assistant Examiner—Han L Liu
(74) Attorney, Agent, or Firm—Michael J. Striker

(57) ABSTRACT

In a pump, particularly for cooling water, with an impeller wheel (2) that is supported so that it can rotate in a pump chamber (6), an excitation device (12) for driving the impeller wheel (12) to rotate, and a control circuit (19) for the excitation device (12), the control circuit (19) and the excitation device (12) are thermally separated from one another by the pump chamber (6). The waste heat of the excitation device (12) is removed by the fluid circulating in the pump chamber (6) to the extent that the control circuit (19) is prevented from overheating.

16 Claims, 2 Drawing Sheets

COOLING WATER PUMP

Figure 1:
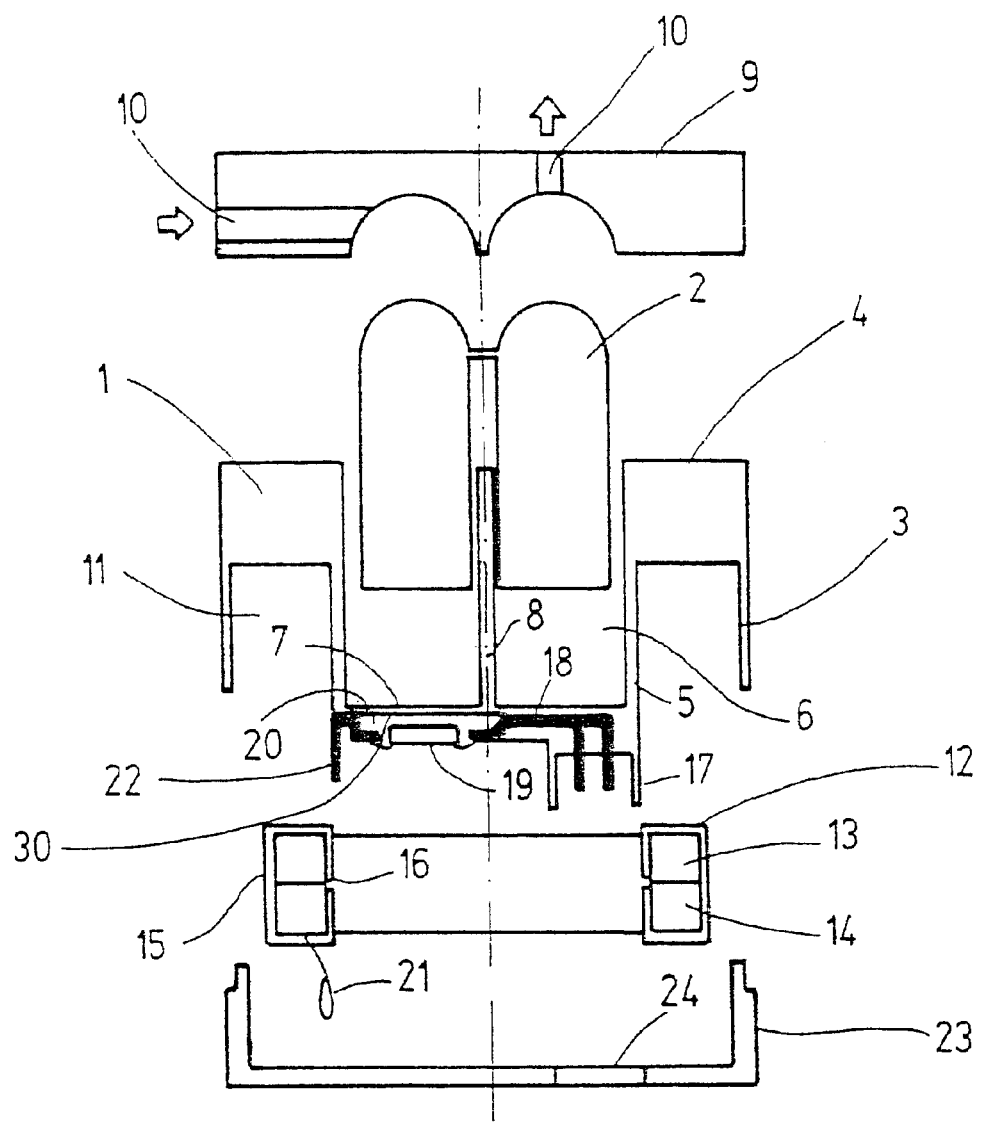

The invention relates to a pump, in particular for cooling water of the motor vehicle. In the automotive sector, the waste heat of the internal combustion engine is reduced, for example, by improving the efficiency. The combustion heat is conveyed via both the heat exchanger for the interior as well as via the radiator grill so that when cold starting in winter, the passenger compartment is relatively slow to heat. In order to increase comfort, electrically operated auxiliary water pumps are increasingly used in order to be able to heat the interior in a concerted manner.

A pump of this kind, with an impeller wheel supported in rotary fashion in a pump chamber, an excitation device for driving the impeller wheel to rotate, and a control circuit for the excitation device has been disclosed by DE 44 11 960 A1. In this known pump, the excitation device and the control circuit are accommodated in a common essentially cylindrical chamber, which is hermetically sealed in relation to the pump chamber and protrudes into it.

The impeller wheel is connected to an annular rotor which extends around the excitation device in an annular part of the pump chamber. With this construction, waste heat from the excitation device can flow into the pump fluid only through the wall of the pump chamber and the impeller wheel that overlaps the pump chamber in the axial direction. The flow of heat in the radial direction is only possible through two walls and the rotor. However, the control circuit that is mounted on a printed circuit board is subjected directly to the waste heat. The maximal operating temperature of this pump is consequently determined by the limited temperature resistance of the material of the printed circuit board and/or the softening temperature of the solder used to mount the components of the control circuit on the printed circuit board.

During assembly of the pump, it is necessary to slide the excitation device and the printed circuit board with the control circuit into the corresponding chamber through a rear opening and then to close the opening with a cover, which has a plug formed onto it for the power supply contacts of the control circuit. An electrical contact between the plug and the control circuit is thereby produced with the aid of pins, which are mounted on the printed circuit board and, during attachment of the cover, are slid into a bushing affixed to the cover. The bushings are fitted onto the pins blind; it is therefore difficult to detect and correct bad contacts in which the pin and bushing are not engaged in one another as desired. The quality of an insertion connection of this kind can deteriorate if it is subjected to intense temperature changes or high temperatures.

It is therefore expected that in the near future, there will be a demand in automotive engineering for cooling water pumps which are in a position to withstand permanent operating temperatures of 130 to 140° C. this arises not only from the fact that higher cooling water pressures and cooling water boiling temperatures are provided but also from the fact that with continuing miniaturization of the auxiliary units installed in motor vehicles, which also include a cooling water pump, the power density of these units increases and consequently, the operating temperature of the units increases as a result of self heating.

However, printed circuit boards and solders that are suitable for such operating conditions are expensive.

ADVANTAGES OF THE INVENTION

The invention proposes a pump construction with the features mentioned at the beginning in which the control circuit and the excitation device are thermally separated from each other by the pump chamber. With an arrangement of this kind, the waste heat of the excitation device is essentially absorbed and removed by the cooling water flowing through the pump chamber so that this waste heat cannot reach the control circuit. This prevents an overheating of the control circuit above the temperature of the cooling water.

An annular attachment of the excitation device around the pump chamber also achieves the fact that the waste heat of the excitation device can also be effectively emitted to the surroundings of the pump, i.e. to the motor chamber in the case of a motor vehicle cooling water pump. This excitation device can be suitably embodied as a claw-pole device.

The provision is also made that the impeller wheel is comprised of a magnetic material, at least in the vicinity of the range of a magnetic field that can be generated by the excitation device. As a result, the impeller itself assumes the function of a rotor which interacts directly with the excitation field, which permits a more lightweight and compact construction of the pump.

The control circuit is preferably disposed on an end wall of the pump chamber. This permits a favorable thermal shielding of the control circuit by the excitation device with a simultaneously compact design and it also permits a magnetic field sensor, which is possibly required for detecting the position of the impeller wheel and must be disposed close to the impeller wheel in order to be effective, to be combined into a single unit with the rest of the control circuit, preferably an integrated circuit.

The pump suitably includes a first housing part, for example made of a temperature resistant plastic, which constitutes a for example a cylindrical side wall and a first end wall of the pump, where an annular hollow space is formed between the side wall of the pump chamber and an outer wall of the first housing part and this annular hollow space contains the excitation device. This housing part, as will be explained in further detail below, is important for a simple assembly of the pump.

A second housing part suitably closes the annular hollow space and defines a chamber for the control circuit.

According to a preferred exemplary embodiment (FIG. 1), the control circuit is mounted in thermal contact with the end wall so that its temperature can be reliably limited by the temperature of the pumped fluid. In this instance, a plug for the electrical power of the control circuit is suitably connected to the end wall. Electrical conductors to and from the control circuit are incorporated into the end wall. This can be executed in such a way that the end wall or the first housing part to which it belongs is embodied as an MID (molded interconnection device), i.e. as an injection molded part with metallized zones, or that conductors in the form of stamped gratings are inserted into the end wall.

The embodiment of the control circuit as an integrated circuit with connections bonded to the electrical conductors permits the use of solder to be completely eliminated on and in the control circuit.

Other preferred exemplary embodiments (FIGS. 2 and 3) provide that the control circuit is mounted in thermal contact with the second housing part. In this instance, plugs and electrical conductors can be formed onto or embedded in the second housing part in a manner similar to that mentioned above in connection with the end wall.

The necessary electrical connections between some of the above-mentioned conductors and the excitation device are preferably produced in a form-fitting manner, particularly by means of resistance welding or ultrasonic welding or by means of hot staking.

The control circuit is preferably embedded in a heat conducting gel or resin, not least to protect it from being touched and contaminated.

Additional features and advantages of the invention ensue from the following description of exemplary embodiments.

Figure 2:
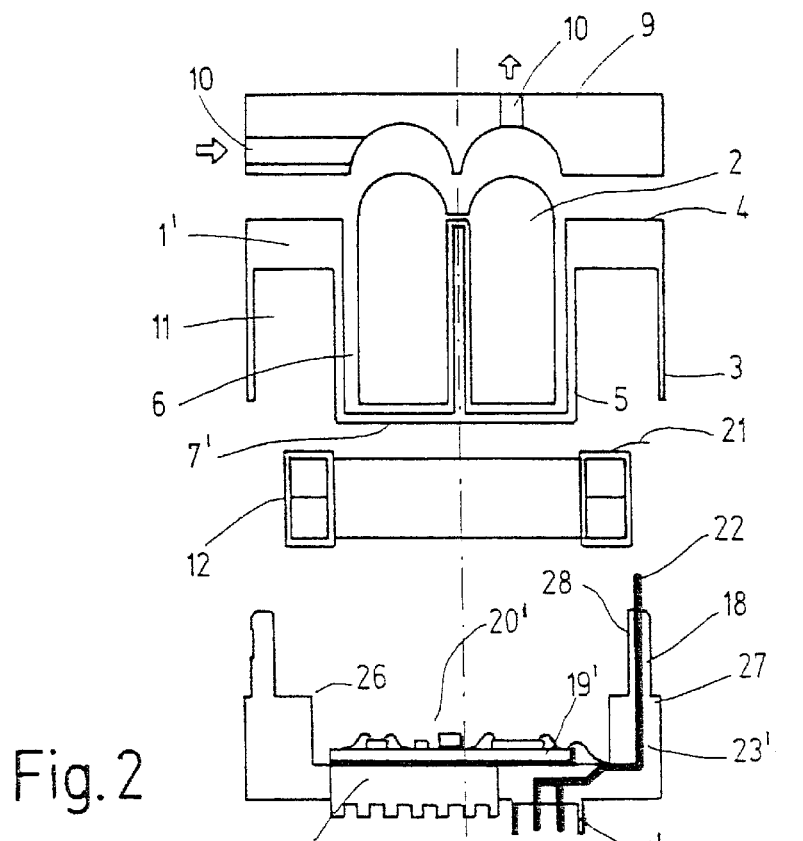
Figure 3:
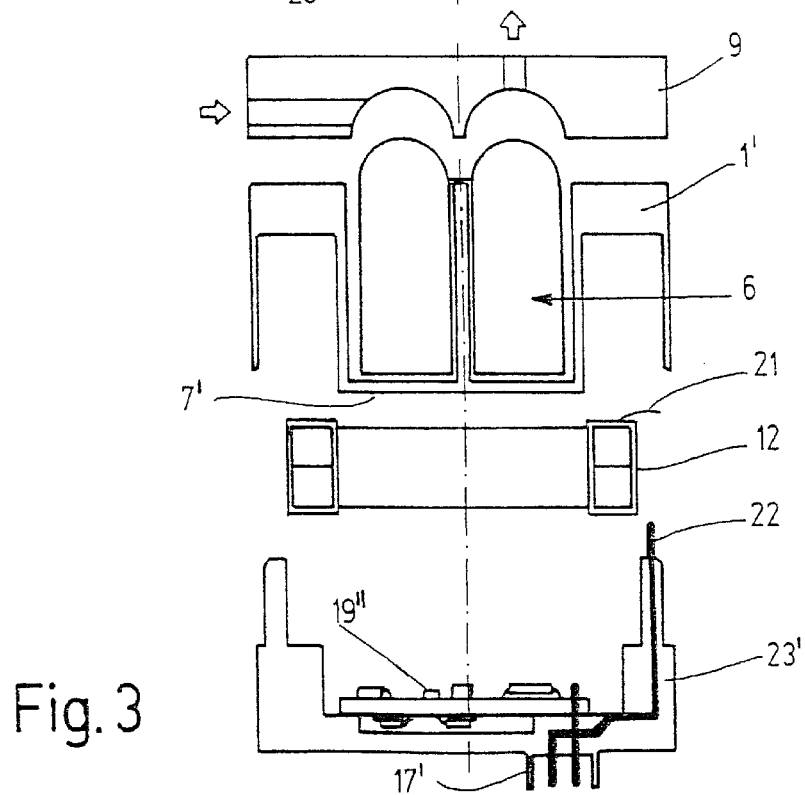

FIGS. 1 to 3 show schematic sections through exemplary embodiments of pumps according to the invention.

DESCRIPTION OF THE EXEMPLARY EMBODIMENTS

In a schematic section and an expanded view, FIG. 1 shows a first exemplary embodiment of the invention. A first housing part 1 includes a cylindrical outer wall 3 which is connected by a flange 4 at its top end in the Figure to a concentric wall, which constitutes a side wall 5 of a pump chamber 6. A first end wall 7 closes the pump chamber toward the bottom in the Figure A mandrel 8 extending in the axial direction from the bottom 7 supports an impeller wheel 2, which can be freely rotated inside the pump chamber 6. A cover 9 is provided for fastening to the flange 4 and constitutes an opposite, second end wall of the pump chamber 6. Inlet and outlet openings 10 for the fluid to be pumped extend through the cover 9.

The outer wall 3, flange 4, and side wall 5 define an annular conduit or hollow space 11 in which an excitation device 12 is accommodated. This excitation device includes two windings 13, 14 staggered in the axial direction, which can be acted on with currents in opposing directions, enclosed in a metallic housing 15, which with the exception of an air gap 16, extends cross sectionally all the way around the windings 13, 14. The position of the air gap in the axial direction varies along the circumference of the housing 15 and results in the fact that depending on the position of the air gap 16, the magnetic field in one of the two windings 13, 14 penetrates into the pump chamber 6 more strongly than the other. At least in the regions in which it is affected by the penetrating magnetic field, but preferably all over for the sake of a simpler manufacture, the impeller wheel 2 is comprised of a magnetic material, preferably a plastic with embedded magnetic particles. These interact with the magnetic field penetrating into the pump chamber 6 and, with a suitable wiring of the windings 13, 14, set the impeller wheel 2 into rotation. A drive principle of this kind is known as the claw-pole motor.

An electrical plug connector 17 is formed onto the end wall 7 of the pump chamber 6 and is of one piece with it. The embodiment of this plug connector can be varied in a manner specific to the use or specific to the client. Contact pins of the plug connector 17 are connected via conductors 18 embedded in the end wall 7 to a control circuit 19 which, in a user-specific integrated circuit, contains all of the functional components required for triggering the closed loop controls 13, 14 and possibly required for detecting the position of the impeller wheel. The control circuit 19 is attached to a non-magnetic metal plate 30, for example glued to it, and is inserted together with it into a recess 20 of the end wall 7. In the vicinity of the recess 20, the pump chamber 6 has only a slight wall thickness which essentially serves only to simply seal the recess 20 in relation to the pump chamber. The metal plate 30 furnishes the necessary strength of the end wall 7 and serves the uniform distribution and efficient removal of the waste heat of the control circuit 19. Its operating temperature is thereby limited by the temperature of the fluid.

Even if the windings 13, 14 heat up beyond the temperature of the fluid during operation, at most, their waste heat can reach the control circuit 19 essentially by means of heat flow via the side wall 5. However, since this side wall 5 is likewise cooled by the fluid, the pump chamber 6 effectively protects the control circuit 19 from the waste heat of the windings.

The control circuit 19 is connected to the conductors 18 in a conventional manner via thin bonding wires. Since this connection is solder-free, operating temperatures of the control circuit of over 100° C. and up to 140° C. are easily permissible without jeopardizing the reliability of the control circuit 19.

Starting with the first housing part 1, which has the strip conductor structures 18 preassembled in it and has the already bonded control circuit 19, the above-described pump can be assembled in a few simple steps. To that end, the excitation device 12 is first slid into the hollow space 11, care being taken to correctly place connecting loops 21 of the excitation device (only one of which is shown in the Figure for the sake of simplicity) around connecting tabs provided for this purpose, for example 22. Then, the tab 22 is bent over and hot pressed in a process known by the name hot staking, as a result of which the loop 21 is securely held. Alternatively, other connecting techniques such as resistance welding or ultrasonic welding can also be used.

Then, a second housing part 23 merely needs to be slid on and connected to the outer wall 3. This second housing part has a hole 24 which the plug connector 17 reaches through. In order to prevent a penetration of dirt and corrosive substances through the hole 24 and into the control circuit 19, and in order to prevent heat transmission from the excitation device 12 to the control circuit 19 through the air, the two housing parts 1, 23 are suitably dimensioned so that the second housing part 23 rests snugly against the end wall 7 so that the recess 20 becomes an essentially closed chamber. In any case, though, the control circuit is cast into the recess 20 with a heat conducting gel or resin which, even in the event that impurities penetrate through the hole 24, prevents them from reaching the control circuit 19 and its bonding wires. The control circuit is consequently hermetically enclosed and protected despite the hole 24.

After this or to start with, the impeller wheel 2 is inserted into the pump chamber 6 and the cover 9 is tightly fastened to the flange 4 in order to close the pump chamber.

This produces a pump design that is extremely compact, but at the same time can be assembled in a convenient and controlled manner since no blind assembly steps are required.

FIG. 2 shows a second embodiment of a pump according to the invention. The cover 9 and the impeller wheel 2 do not differ from those of the first exemplary embodiment and will not be described further. The first housing part 1' differs from the one in FIG. 1 merely in that its end wall 7' is smooth and is not provided so that a control circuit can be mounted on it. The excitation device 12 differs from the one in FIG. 1 merely in its orientation; its connecting loops 21 are disposed on the top side (in the Figure) of the excitation device 12.

In this embodiment, a control circuit 19' is mounted on the second housing part 23' and is thus thermally connected to the surroundings of the pump. Since the available installation space has now become larger, in this embodiment it is possible to design the control circuit 19' in the form of a sealed layer hybrid with discrete components. A cooling body 25 connected to the hybrid is let into the second housing part 23'. The control circuit 19' is only a few millimeters away from the end wall 7' after assembly so that a sensor required for detecting the position of the rotor or the impeller wheel 2, for example a Hall sensor or a magnetoresistive element, which must be close to the object to be measured, can be included in the control circuit.

The second housing part 23' also supports a plug connector 17' that is formed onto it and is of one piece with it, and conductors 18 leading from the plug contacts of the plug connector 17' extend inside the wall of the second housing part 23'.

The second housing part 23' here has the form of a flat basin with a cylindrical outer wall 27. On it inside, this outer wall constitutes a shoulder or a projection 26, whose function on the one hand is to support the excitation device 12 and on the other hand, is to divide the hollow space 11, which accommodates the excitation device 12 when the pump is completely assembled, from a chamber 20', which extends between the end wall 7' of the first housing part 1' and the bottom of the second housing part 23' and accommodates the control circuit 19'. The projection 26 thus prevents the exchange of air between the hollow space 11 and the chamber 20' containing the control circuit 19' and thus prevents the control circuit 19' from overheating.

The outer wall 27 of the second housing part 23' has an upper section 28 that is slightly tapered in order to fit into the hollow space 11 of the first housing part. Some of the conductors 18 running inside the second housing part 23 extend to the upper edge of the upper section 28 where they end in tabs 22. These tabs, as provided in the instance in FIG. 1, are for producing electrical connections for the power supply of the excitation device 12.

This embodiment is distinguished by a particularly simple assembly. In this instance, namely, all of the components shown separately in the Figure, the second housing part 23', excitation device 12, housing top part 1', impeller wheel 2, and cover 9, are simply stacked one on top of the other in sequence and are fastened to one another without having to change the orientation of the pump that is produced. Clearly a construction of this kind is particularly well-suited for a cost-saving automated production.

FIG. 3 shows a modification of the embodiment from FIG. 2, in which the control circuit 19" is a printed circuit board equipped with discrete components on two sides. If it is necessary to equip in this manner for space reasons, it is useful for the chamber 20', which is defined between the end wall 7' of the first housing part 1' and the second housing part 23' and contains the control circuit 19", to be filled with a heat conducting gel or resin which assures a favorable heat contact with the pump chamber and/or the surroundings and protects the control circuit from being overheated by the excitation device 12'.

Since the resin or gel produces a hermetic encasing of the control circuit 19' or 19" as in the first exemplary embodiment, it is not absolutely necessary to seal the connection between the first and second housing part in the top section 28 of the outer wall 27 along its entire length, which further simplifies the manufacture.

What is claim is:

1. A pump with an impeller wheel (2) that is supported so that it can rotate in a pump chamber (6), an excitation device (12) for driving the impeller wheel (2) to rotate, and a control circuit (19, 19', 19") for the excitation device (12), characterized in that the control circuit (19, 19', 19") and excitation device (12) are separated from one another by the pump chamber (6), whereby the control circuit (19, 19', 19") is protected from heat produced by the excitation device (12).

2. The pump according to claim 1, characterized in that the excitation device (12) extends around the pump chamber (6) in an annular fashion.

3. The pump according to claim 1, characterized in that the excitation device generates a magnetic field, wherein the impeller wheel (2) is comprised of a magnetic material at least proximate to the magnetic field generated by the excitation device (12).

4. The pump according to claim 1 characterized in that the control circuit (19, 19', 19") is disposed against an end wall (7, 7') of the pump chamber (6).

5. The pump according to claim 1, characterized in that the pump includes a first housing part (1, 1'), said first housing part (1, 1') having a side wall (5) and a first end wall (7, 7') of the pump chamber (6), wherein an annular hollow space (11) is formed between the side wall (5) of the pump chamber and an outer wall (3) of the first housing part (1, 1'), and wherein said annular hollow space contains the excitation device (12).

6. The pump according to claim 5, characterized in that it includes a second housing part (23, 23') which closes the annular hollow space (11) and defines a chamber (20, 20') for the control circuit (19, 19', 19").

7. The pump according to claim 6, characterized in that the control circuit (19) is mounted in thermal contact with the end wall (7).

8. The pump according to claim 7, characterized in that a plug (17) for an electrical supply of the control circuit (19) and/or of the excitation device (12) is formed onto the end wall (7).

9. The pump according to claim 7, characterized in that electrical conductors (18) are provided to and from the control circuit (19), wherein said electrical conductors are incorporated into the end wall (7).

10. The pump according to claim 9, characterized in that the control circuit (19) is an integrated circuit and is bonded to the electrical conductors (18).

11. The pump according to claim 6, characterized in that the control circuit (19', 19") is mounted in thermal contact with the second housing part (23').

12. The pump according to claim 11, further comprising a plug connector (17) for the electrical supply of the control circuit (19', 19") and/or the excitation device (12), wherein the plug connector (17) is formed onto the second housing part (23').

13. The pump according to claim 11, characterized in that electrical conductors (18) are provided to and from the control circuit (19', 19"), wherein said electrical conductors are incorporated into the second housing part (23').

14. The pump according to claim 9, characterized in that the excitation device includes connections (21), wherein said connections (21) positively and lockingly engage particular conductors (18) to form form-fitting connections.

15. The pump according to claim 14, characterized in that the form-fitting connections are produced by means of resistance welding or ultrasonic welding or by means of hot staking.

16. The pump according to claim 1, further comprising a heatconducting gel or resin, wherein said gel or resin contains said control circuit (19, 19', 19") embedded therein.

* * * * *